June 2, 1970  J. F. DILLON, JR  3,515,457

MAGNETICALLY-CONTROLLED BEAM DEFLECTOR

Filed Jan. 12, 1968

INVENTOR
J. F. DILLON, JR.
BY
ATTORNEY

United States Patent Office 3,515,457
Patented June 2, 1970

---

3,515,457
MAGNETICALLY-CONTROLLED BEAM DEFLECTOR
Joseph F. Dillon, Jr., Morris Township, Morris County, N.J., assignor to Bell Telephone Laboratories, Incorporated, Murray Hill, N.J., a corporation of New York
Filed Jan. 12, 1968, Ser. No. 697,440
Int. Cl. G02f 1/22
U.S. Cl. 350—151                                  4 Claims

ABSTRACT OF THE DISCLOSURE

A high-speed, magnetically-controlled optical beam deflection system comprising a plurality of stacked plates of yttrium or rare earth iron garnets in which alternate plates are identical and adjacent plates exhibit antiparallel net magnetic moments. Electromagnetic wave energy propagating parallel to the plane of the plates experiences lateral beam deflection in the presence of a longitudinal component of magnetization.

BACKGROUND OF THE INVENTION

Field of the invention

This invention relates to beam deflection systems and, more particularly, to magnetically-controlled optical beam deflection systems for use in memories, logic, switching, and light modulation arrangements.

Description of the prior art

With the advent of the optical maser and its highly coherent optical frequency beam, considerable attention has been given to the problem of deflecting a light beam in response to an external control signal. One area of investigation has been concerned with variable optical diffraction gratings in which a light-transparent, homogeneous medium is disturbed by the passage of waves of a different form of energy to produce a periodic variation of some parameter that affects the index of refraction of the medium.

Many of the structures of the prior art are limited by the fact that the wavelength of the disturbing waves in frequency ranges that can be readily generated are many times that of the light, leading to excessively wide interaction regions or to poor resolution.

SUMMARY OF THE INVENTION

In accordance with the present invention, it has been recognized that in yttrium and rare earth iron garnets it is possible to achieve compensation of the tetrahedral and octahedral magnetic moments associated with the iron sublattices and to obtain a material with zero moment for typical operating conditions. More specifically, this is done by a gallium substitution, in which gallium ions preferentially replace tetrahedral iron. By then selecting a first material with a composition in which the octahedral sites occupied by trivalent iron ions slightly predominate, and a second material with a composition in which iron ions on the tetrahedral sites slightly predominate, the two materials will exhibit very nearly the same net magnetic moment, but in the first case the net moment is parallel to that of the octahedral iron and in the second case the net moment is antiparallel to that of the octahedral iron. By interleaving plates of these two compositions, a phase-shifting array can be constructed which, when illuminated by light definable in terms of circular polarization, will deflect the transmitted light in response to a small change in the direction of the magnetization. Since the material is of a composition close to the magnetization compensation point, relatively small fields are sufficient to move the magnetization through large angles at low power levels. In the specific embodiment to be described, an array of plates of gallium-substituted rare earth iron garnets having net magnetic moments which are alternately parallel and antiparallel to the moments of iron ions in octahedral sites are stacked together and illuminated with optical frequency radiation. The stacked plates are initially magnetized transverse to the direction of light propagation therethrough, which is parallel to the wide faces of the plates. Beam deflection is accomplished by impressing a component of magnetization parallel to the propagation direction of radiation incident on the array.

BRIEF DESCRIPTION OF THE DRAWING

The various objects of the invention, together with its nature, various features, and advantages, will appear more fully upon consideration of the various illustrative embodiments now to be described in detail in connection with the accompanying drawing, in which.

DETAILED DESCRIPTION

Figure 1:
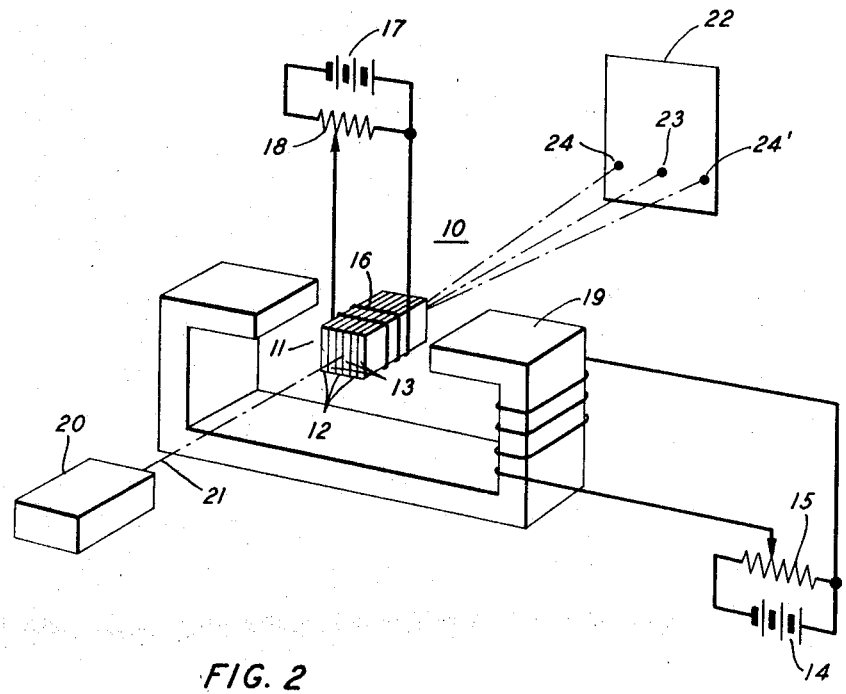
FIG. 1 is a perspective view, partly in schematic of an optical system including a beam deflector in accordance with the principles of the invention.

Referring now in greater detail to the device of FIG. 1, there is shown a light deflection system 10 in which the active medium 11 comprises a plurality of parallel plates 12, 13 of gallium-substituted rare earth iron garnet in which the moment is alternately parallel and antiparallel to that of iron ions in octahedral sites.

As disclosed and claimed in U.S. Pat. 2,974,568, granted Mar. 14, 1961 to the applicant herein, yttrium iron garnet and others of the same class have been found to be substantially transparent to infrared light and light of shorter wavelengths. In addition, when magnetically-polarized in a given direction, large Faraday-effect rotations of light propagating parallel to the direction of magnetic polarization have been observed. This means that the material is circularly dichroic and, in particular, introduces different phase velocities to light having positive and negative circularly polarized components relative to the magnetic polarization.

This result is turned to account in accordance with the present invention by utilizing the antiparallel magnetic moments within plates, 12, 13 of different compositions to produce, in the presence of a saturating magnetic field normal to the broad faces of plates 12, 13 and a longitudinal magnetic field parallel to the propagation direction, a diffraction grating effect, whereby light passing through medium 11 is deflected at an angle dependent upon the thickness of the plates and the wavelength of the light.

In accordance with the specific embodiment illustrated, medium 11 is located between the poles of suitably-shaped magnet 19 fed from a current source 14 through rheostat 15. The applied magnetic field should be of sufficient strength to magnetically saturate the medium 11.

Simultaneously, a longitudinally-directed, magnetic control field can be applied through winding 16 which is fed from current source 17 and controlled by rheostat 18. This longitudinal control field is advantageously controllable from zero (no field), for which no deflection occurs, to a value for which the phase velocity of radiation propagated through plate 12 is 180° different from that simultaneously propagated through plate 13. As the longitudinal field is increased, the transverse field can be reduced in intensity so long as the material remains saturated.

A suitable optical system is schematically illustrated in FIG. 1, in which a source 20 of a collimated light beam 21, such as an optical maser, illuminates medium 11. For the purposes of the present invention, it is immaterial whether the light in beam 21 is linearily polarized, circularly polarized or randomly polarized, although the phase velocity effects within medium 11 can be understood by an analysis of wave propagation effects on oppositely-rotating, circularly-polarized wave components. Beam 21 is directed into medium 11 parallel to the wide faces of plates 12, 13 and emerges therefrom to impinge on object plane 22 at either the central, nondeflected point 23, or points 24, 24', for which beam deflection has occurred. Object plane 22 is representative of an array of light-sensitive storage devices, an array of photo-sensitive switching elements, a coding plate, or any one of a number of kinds of devices depending upon the particular use or application of the deflection system. Optionally, a suitable system of lenses, not shown, may be interposed along the path of the light beam according to the practice in the art. A disclosure, by way of example, of such a lens system may be found in the copending, commonly-assigned application of E. I. Gordon, Ser. No. 377,353, filed July 23, 1964.

The operation of this deflector depends on the manner in which light propagates in a magnetic medium. It is found that for light traveling along the direction of the magnetization there are two noninteracting normal modes of propagation, positive circularly polarized and negative circularly polarized. There is a difference in the velocity in which these two modes move through the crystal and this difference is proportional to the projection of the magnetization on the line of sight. One can adjust the velocity difference, that is, the circular birefringence, by varying the projection of the magnetization on the line of sight. This magnetization-related difference in velocity, and thus a difference in refractive index, for the two circular polarizations is known as the "magnetic circular birefringence."

The composition of plates 12, 13 in medium 11 is of particular importance in accordance with the inventive principles here involved. Essentially, the material of both plates comprises gallium-substituted yttrium or rare earth iron garnets. Any of the rare earths of atomic number higher than that of neodymium can be used. This would include, for example, samarium, europium, gadolinium, terbium, dysprosium, holmium, erbium, thulium, ytterbium, and lutetium, as well as mixtures thereof.

The chemical formula for yttrium iron garnet (YIG), for example, is usually written $Y_3Fe_5O_{12}$. It is well understood that the iron ions in such a composition are disposed in either octahedral or tetrahedral lattice sites in accordance with the formulation $Y_3(Fe_2)[FeO_4]_3$, where the $(Fe_2)$ represents octahedral site iron ions and $[FeO_4]_3$ represents tetrahedral site iron ions. Thus it can be seen that for each formula unit of the garnet material two iron ions are in octahedral sites and three iron ions are in tetrahedral sites. The magnetic moments of the octahedral iron ions are in alignment in a first given sense, while the magnetic moments of the tetrahedral iron ions, also in alignment, are antiparallel to those of the octahedral iron ions. Thus, in the normal YIG crystal, the net moment is parallel to that of the iron ions in tetrahedral sites and is equal to the moment of one iron ion for each formula unit. In accordance with the principles of the present invention, certain of the iron ions in the yttrium or rare earth iron garnet material are replaced by nonmagnetic ions. For example, gallium can be advantageously substituted, in a manner which is fully set out in an article entitled "Gallium-Substituted Yttrium Iron Garnet" by S. Geller, A. A. Cape, G. P. Espinoza, and D. H. Leslie which appeared in vol. 148, No. 2 of Physical Review beginning at p. 522.

It is known that the gallium ions have a preference for tetrahedral sites within the crystal lattice. That is, for a given number of gallium ions successfully introduced into the garnet lattice, a proportion in the vicinity of 90 percent will fill tetrahedral iron ion sites. Thus, the net magnetic moment of the iron garnet, which had been caused by the predominance of tetrahedral iron, can be compensated by nonmagnetic ion substitution. Compensation of the magnetic moment with composition may be obtained in other systems, for instance:

$$Y_{3-x}Ca_xFe_{5-x}Si_xO_{12}$$

Other examples are given in the Geller et al. publication.

Since it is also known that the magnetic circular birefringence is principally associated with the magnetic moment of the iron ions in octahedral sites rather than with the net magnetic moment of the crystal, substitution for tetrahedral iron has a comparatively slight effect on the magnetic circular dicroism while having a strong effect on the net moment of the crystal.

Figure 2:
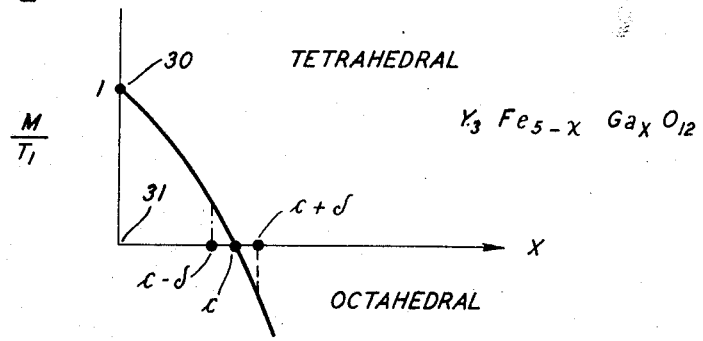
FIG. 2 is a graphical illustration depicting certain magnetic characteristics of the garnet material in FIG. 1.

A convenient formulation for gallium-substituted yttrium iron garnet, as given in FIG. 2, is $Y_3Fe_{5-x}Ga_xO_{12}$. This expression shows that for each gallium ion, one of the five original iron ions is replaced. The result of the substitution is shown graphically in FIG. 2 as a function of temperature-normalized magnetic moment and the quantity $x$ which is the fractional amount of gallium ions substituted for iron. Point 30 represents uncompensated YIG with a three-to-two tetrahedral predominance. It can be seen from graph 31 that for a value $x=c$, the tetrahedral and octahedral moments of the remaining iron are equal and thus cancel, leaving a net moment of zero.

In accordance with the principles of the invention, two values of $x$ different from $c$ by a small amount $\delta$ are chosen, one with a slightly predominant octahedral moment and one with a slightly predominant tetrahedral moment. Such compositions are attained by slightly greater and slightly lesser gallium substitution, respectively. A typical value for $x$ at the compensation point is 1.25. An advantageous value for $\delta$ would then be .05. Because the absolute value of magnetization for composition at $c+\delta$ and $c-\delta$ is substantially equal, the structure of interleaved plates exhibits a substantially uniform magnetization.

In the operation of the beam deflector of FIG. 1, a plurality of plates 12, 13 are stacked together, using adhesive layers of wax, for example, between plates, and are disposed between the poles of magnet 19. The direct-current magnetic field applied is sufficient to saturate the medium 11 in a direction normal to the broad faces of the plates and transverse to the direction of propagation of light beam 21. For such a condition the light beam sees a substantially homogeneous medium and passes through undisturbed and undeflected to central spot 23 on object plane 22. When, however, a longitudinal component of magnetization is introduced by energizing winding 16, the situation is changed.

Figure 3:
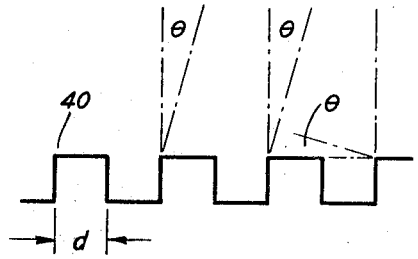
FIG. 3 is a phase diagram helpful in understanding the invention.

Resolving the incident light beam 21 into its clockwise and counterclockwise components, and considering each of these separately, it can be seen that the circularly-polarized components of a first sense see each of plates 12 as exhibiting a first sense of sublattice magnetic moment which produces a first phase constant, while simultaneously seeing each of plates 13 as exhibiting a second antiparallel sense of sublattice magnetic moment which produces a different phase constant. Thus, the beam sees a variable diffraction grating and, when the phase difference between the two beam portions is 180°, is completely diffracted out of the zero order lobe 23 primarily into a first order diffraction lobe defined by the relationship $$\sin \theta = \lambda/2d$$

where $\theta$ is the diffraction angle from normal, $\lambda$ is the wavelength of the incident light, and $d$ is the grating spacing; that is, the total thickness of one set of plates 12, 13. As shown in FIG. 2 the angle θ defines that direction in which the optical path difference between rays from successive points of 180° phase differential equals the wavelength of the transmitted radiation. If in FIG. 3 the battlement-shaped line 40 is considered to be the phase front of a single sense of circularly-polarized wave energy after passing through the medium 11 of FIG. 1, the peaks and valleys are 180° apart in phase.

As an example, using a source of light of 2 microns wavelength, the plates 12, 13 could be advantageously 20 microns thick, a practical thickness for polishing and other necessary handling procedures. This sample might be approximately 1 cm. in length. With the magnetization transverse to the light path, there is no phase difference between light passing through the two different compositions. However when the magnetization is rotated so that it lies along the light path the retardation from the plate characterized by the $(c-\delta)$ composition would be 180° from that of the $(c+\delta)$ plate, and no light could go into the first order spot at point 23 on object plane 22. Rather, most of the light would appear at points 24, 24', the first order diffraction location. For the dimensions cited, θ would be 2½°. The speed with which such deflection can be accomplished is high, of the order of hundreds of megacycles.

The thickness of medium 11 along the transmission direction depends upon a compromise between several factors. In particular, the optical attenuation of a given material is small when the path length through the material is small. Similarly, the optical bandwidth of the device is decreased by increasing the path length. On the other hand, the degree of magneto-optic interaction is increased by increasing the path length. Thus, the proper path length with a given material for a particular application may be determined experimentally.

While only one deflector has been shown producing deflection in a single plane, it is apparent that a pair of orthogonally-related deflectors disposed in series can produce diffraction in two dimension. Furthermore, a large plurality of deflectors can be arranged in an array suitable for digital deflection under the control of a plurality of input signals.

In all cases it is to be understood that the above-described arrangements are merely illustrative of a small number of the many possible applications of the principles of the invention. Numerous and varied other arrangements in accordance with the principles may be readily devised by those skilled in the art without departing from the spirit and scope of the invention.

What I claim is:
1. An arrangement for deflecting light comprising a first plurality of substantially identical plates of a first magnetic material which transmits the light to be deflected,
a second plurality of substantially identical plates of a second magnetic material which transmits the light to be deflected,
the two pluralities being interleaved to form a stack in which adjacent plates have magnetic moments which are substantially equal and anti-parallel, and
means for applying a magnetic field of strength sufficient to saturate magnetically the plates of the stack, the magnetic field having a component normal to the broad faces of the plates in the stack and a component parallel to the broad faces,
whereby by variation in the magnitude of the component parallel to the broad faces of the stack there is deflected light which is propagating through the stack parallel to the broad faces of the stack when there is a component parallel to the direction of the incident light.

2. An arrangement in accordance with claim 1 in in which the first magnetic material exhibits a dominant tetrahedral moment and the second magnetic material exhibits a dominant octahedral moment.

3. An arrangement in accordance with claim 1 in which the first and second materials are compensated materials taken from the group consisting of yttrium and rare earth iron garnets.

4. An arrangement in accordance with claim 1 in which the applied magnetic field includes a steady component normal to the broad faces of the plates and a variable component parallel to the broad faces of the plates.

References Cited

UNITED STATES PATENTS

| 3,174,044 | 3/1965 | Tien | 250—199 |
| 3,245,314 | 4/1966 | Dillon | 350—151 |
| 3,369,122 | 2/1968 | Bohrer | 350—151 XR |

FOREIGN PATENTS

| 460,666 | 1/1937 | Great Britain. |

OTHER REFERENCES

Suets et al., "Physical Review Letters," vol. 14, No. 17, April 26, 1967, "Magnetic Birefringence of En Se, pp. 687–689.

Du Pré, "Symposium on Modern Advances in Microwave Techniques," Poly. Inst. of Brooklyn Nov. 8–10, 1954, "Experiments on Microwave Faraday and Cotton-Mouton Effects."

Palik, "A Brief Survey of Magnetooptics," "Applied Optics," vol. 6, No. 4. April 1967, pp. 597–602.

PAUL R. GILLIAM, Primary Examiner